US00RE47054E

(19) United States
(12) Reissued Patent
Kovacevic

(10) Patent Number: US RE47,054 E
(45) Date of Reissued Patent: Sep. 18, 2018

(54) SYSTEM FOR DIGITAL TIME SHIFTING AND METHOD THEREOF

(71) Applicant: ATI Technologies ULC, Markham (CA)

(72) Inventor: Branko Kovacevic, Willowdale (CA)

(73) Assignee: ATI Technologies ULC, Markham, Ontario (CA)

(21) Appl. No.: 15/368,285

(22) Filed: Dec. 2, 2016

Related U.S. Patent Documents

Reissue of:
(64) Patent No.: 7,095,945
Issued: Aug. 22, 2006
Appl. No.: 09/707,060
Filed: Nov. 6, 2000

(51) Int. Cl.
*H04N 9/80* (2006.01)
*H04Q 1/46* (2006.01)

(52) U.S. Cl.
CPC ..... *H04Q 1/46* (2013.01)

(58) Field of Classification Search
None
See application file for complete search history.

(56) References Cited

U.S. PATENT DOCUMENTS 5,457,701 A 10/1995 Wasilewski et al.
5,506,904 A 4/1996 Sheldrick et al.
5,517,250 A 5/1996 Hoogenboom et al.
5,521,922 A * 5/1996 Fujinami et al. ..... 348/423.1
5,521,927 A 5/1996 Kim et al.
5,559,999 A 9/1996 Maturi et al.
5,598,415 A 1/1997 Nuber et al.
5,691,664 A 11/1997 Anderson et al.
5,703,887 A 12/1997 Heegard et al.
5,726,989 A 3/1998 Dokic
5,742,623 A 4/1998 Nuber et al.
5,754,783 A 5/1998 Mendelson et al.
5,768,292 A 6/1998 Galbi
5,778,191 A 7/1998 Levine et al.
(Continued)

FOREIGN PATENT DOCUMENTS

EP 0942603 A2 9/1999
EP 1014730 A1 6/2000

OTHER PUBLICATIONS

"Transmission of Non-Telephone Signals," Information Technology—Generic Coding of Moving Pictures and Associated Audio Information: Systems, ITU-T Recommendation H.222.0, Jul. 1995, 120 pp.

(Continued)

*Primary Examiner* — Colin Larose
(74) *Attorney, Agent, or Firm* — Sterne, Kessler, Goldstein & Fox P.L.L.C.

(57) ABSTRACT

A multiplexed packetized data stream carrying real-time multimedia programs is received at a first hardware demultiplexer. Based on a user input, a video and timing portion of a program associated with the multiplexed packetized data stream can be stored for subsequent display. One type of subsequent display is time shifted display, where the stored portion of the program is played back while new portions of the program are being stored. During time shifted play back, a second hardware demultiplexer can be used, so that one demultiplexer stores new data and maintains a current clock value while the other decodes and displays the stored data.

55 Claims, 7 Drawing Sheets

(56) References Cited

U.S. PATENT DOCUMENTS 5,801,781 A 9/1998 Hiroshima et al.
5,805,602 A 9/1998 Cloutier et al.
5,809,538 A 9/1998 Pollman et al.
5,812,760 A 9/1998 Mendenhall et al.
5,812,976 A 9/1998 Ryan
5,828,416 A 10/1998 Ryan
5,831,690 A 11/1998 Lyons et al.
5,835,493 A 11/1998 Magee et al.
5,841,472 A 11/1998 Rim et al.
5,856,973 A 1/1999 Thompson
5,859,660 A 1/1999 Perkins et al.
5,898,695 A 4/1999 Fujii et al.
5,901,178 A 5/1999 Lee et al.
5,917,830 A 6/1999 Chen et al.
5,920,572 A * 7/1999 Washington ..... H04N 21/4181 348/476
5,923,860 A 7/1999 Olarig
5,936,640 A 8/1999 Horan et al.
5,936,925 A * 8/1999 Yoshio et al. ..... 360/39
5,946,318 A 8/1999 Post
5,948,119 A 9/1999 Bock et al.
5,949,436 A 9/1999 Horan et al.
5,959,659 A 9/1999 Dokic
5,982,436 A 11/1999 Balakrishnan et al.
5,990,958 A 11/1999 Bheda et al.
6,014,368 A 1/2000 Sanami
6,038,000 A 3/2000 Hurst, Jr.
6,043,828 A 3/2000 Ort
6,058,459 A 5/2000 Owen et al.
6,067,303 A 5/2000 Aaker et al.
6,072,832 A * 6/2000 Katto ..... 348/423.1
6,108,046 A 8/2000 Wu et al.
6,118,462 A 9/2000 Margulis
6,122,123 A 9/2000 Saeijs et al.
6,128,026 A 10/2000 Brothers, III
6,134,272 A 10/2000 Rim
6,141,358 A 10/2000 Hurst, Jr. et al.
6,148,135 A * 11/2000 Suzuki ..... 386/12
6,157,674 A 12/2000 Oda et al.
6,173,333 B1 1/2001 Jolitz et al.
6,181,706 B1 1/2001 Anderson et al.
6,181,713 B1 1/2001 Patki et al.
6,188,703 B1 2/2001 Dobson et al.
6,223,211 B1 4/2001 Hamilton et al.
6,226,291 B1 5/2001 Chauvel et al.
6,226,769 B1 5/2001 Schuster et al.
6,233,256 B1 5/2001 Dieterich et al.
6,233,389 B1 * 5/2001 Barton et al. ..... 386/68
6,236,432 B1 5/2001 Lee
6,269,107 B1 7/2001 Jong
6,275,507 B1 8/2001 Anderson et al.
6,275,534 B1 8/2001 Shiojiri
6,285,408 B1 9/2001 Choi et al.
6,292,490 B1 9/2001 Gratacap et al.
6,301,248 B1 10/2001 Jung et al.
6,310,652 B1 10/2001 Li et al.
6,310,898 B1 10/2001 Schwartz
6,310,922 B1 10/2001 Canfield et al.
6,323,910 B1 11/2001 Clark, III
6,330,285 B1 12/2001 Crosby et al.
6,333,938 B1 12/2001 Baker
6,336,200 B1 1/2002 Wolfgang
6,351,471 B1 2/2002 Robinett et al.
6,356,567 B2 3/2002 Anderson et al.
6,359,911 B1 3/2002 Movshovich et al.
6,378,035 B1 4/2002 Parry et al.
6,380,991 B1 4/2002 Teichmer
6,397,000 B1 * 5/2002 Hatanaka ..... H04N 9/7921 386/327
6,414,954 B1 7/2002 Miyamoto
6,424,658 B1 7/2002 Mathur
6,425,021 B1 7/2002 Ghodrat et al.
6,427,169 B1 7/2002 Elzur
6,434,146 B1 8/2002 Movshovich et al.
6,434,170 B1 8/2002 Movshovich et al.
6,438,145 B1 8/2002 Movshovich et al.
6,449,352 B1 9/2002 Takahashi et al.
6,449,656 B1 9/2002 Elzur et al.
6,463,059 B1 10/2002 Movshovich et al.
6,463,486 B1 10/2002 Parry et al.
6,493,847 B1 12/2002 Sorgi et al.
6,512,775 B1 1/2003 Eleftheriades et al.
6,526,175 B2 2/2003 Sodagar et al.
6,538,999 B1 3/2003 Sato
6,557,031 B1 4/2003 Mimura et al.
6,567,471 B1 5/2003 Yoshinari
6,573,942 B1 6/2003 Crinon
6,591,058 B1 7/2003 O'Connor et al.
6,621,870 B1 9/2003 Gordon et al.
6,643,449 B1 * 11/2003 Nagata ..... G02B 6/0038 348/E5.007
6,751,170 B2 * 6/2004 Ueki ..... 369/32.01
6,778,533 B1 * 8/2004 Kovacevic ..... H04N 5/4401 348/E5.005
6,792,000 B1 * 9/2004 Morinaga et al. ..... 386/124
8,260,109 B2 9/2012 Kovacevic
2003/0206605 A1 11/2003 Anderson
2007/0009236 A1 1/2007 Kovacevic

OTHER PUBLICATIONS

"Information Technology—Generic Coding of Moving Pictures and Associated Audio Information—Part 3: Audio," ISO/IEC 13818-3, Second Edition, Apr. 15, 1998, 116 pp.

Chen, Zhigang et al., "Real Time Video and Audio in the World Wide Web," 17 pp. [online] [Retrieved from the Internet Apr. 2, 2008 at URL <http://www.geckil.com/~harvest/mirror/www.w3.org/Conferences/WWW4/Papers/p211/>.

Civanlar et al., "RTP Payload Format for Bundled MPEG," May 1998, 8 pp. [online] [Retrieved from the Internet Apr. 2, 2008 URL <http://www.geckil.com/~harvest/rfc/rfc2343.txt>.

Hoffman et al., "RTP Payload Format for MPEG1/MPEG2 Video," Jan. 1998, 15 pages, [online] [Retrieved from the Internet Apr. 2, 2008 URL <http://www.geckil.com/~harvest/rfc/rfc25250.txt>.

Bolot et al., "Adaptive Error Control for Packet Video in the Internet," Internet Conference on Image Processing, 1996. Proceedings, pp. 25-28, vol. 1, Sep. 16-19, 1996, ISBN 0-7803-3259-8.

Feng, Jian et al., "Error Concealment for MPEG Video Transmissions," Mar. 13, 1997, IEEE Transactions on Consumer Electronics, pp. 183-187, vol. 43, Issue 2, ISSN 0098-3063.

Le Gall, Didier, "MPEG: Video Compression Standard for Multimedia Applications," Communications of the ACM, Apr. 1991, vol. 34, No. 4, pp. 47-58.

Zhu, Wenw et al., "End-to-end Modeling and Simulation of MPEG-2 Transport Streams over ATM Networks with Jitter," 1998 IEEE Transactions on Circuits and Systems for Video Technology, vol. 8, No. 1, Feb. 1998, pp. 9-12.

Kassler, et al., "Simulating MPEG-2 Transport Stream Transmission over Wireless ATM," 1999 IEEE, 0-7803-5041-3/99, pp. 3057-3060.

Notice of Allowance for U.S. Appl. No. 11/492,681, dated Apr. 7, 2012; 4 pages.

Final Office Action for U.S. Appl. No. 11/492,681, dated Oct. 14, 2011; 12 pages.

Non-Final Office Action for U.S. Appl. No. 11/492,681, dated Mar. 25, 2011; 12 pages.

Non-Final Office Action for U.S. Appl. No. 11/492,681, dated Oct. 7, 2010; 10 pages.

Notice of Allowance for U.S. Appl. No. 09/707,060, dated Apr. 5, 2006; 8 pages.

Final Office Action for U.S. Appl. No. 09/707,060, dated Jan. 20, 2006; 17 pages.

Non-Final Office Action for U.S. Appl. No. 09/707,060, dated Jun. 15, 2005; 21 pages.

Non-Final Office Action for U.S. Appl. No. 09/707,060, dated Oct. 4, 2004; 14 pages.

Petitioner's Power of Attorney, *LG Electronics, Inc.* v. *ATI Technologies ULC*, IPR2015-00321 (P.T.A.B.), filed Dec. 10, 2014; 2 pages.

(56) References Cited

OTHER PUBLICATIONS

Petition for Inter Partes Review of U.S. Pat. No. 7,095,945, *LG Electronics, Inc.* v. *ATI Technologies ULC*, IPR2015-00321 (P.T.A.B.), filed Dec. 10, 2014; 67 pages.
Patent Owner's Mandatory Notices, *LG Electronics, Inc.* v. *ATI Technologies ULC*, IPR2015-00321 (P.T.A.B.), filed Dec. 31, 2014; 5 pages.
Patent Owner's Power of Attorney, *LG Electronics, Inc.* v. *ATI Technologies ULC*, IPR2015-00321 (P.T.A.B.), filed Dec. 31, 2014; 3 pages.
Notice of Filing Date Accorded to Petition and Time for Filing Patent Owner Preliminary Response, *LG Electronics, Inc.* v. *ATI Technologies ULC*, IPR2015-00321 (P.T.A.B.), mailed Jan. 2, 2015; 3 pages.
Patent Owner's Motion for Pro Hac Vice Admission of Aaron R. Fahrenkrog Under 37 C.F.R. § 42.10(c), *LG Electronics, Inc.* v. *ATI Technologies ULC*, IPR2015-00321 (P.T.A.B.), filed Jan. 15, 2015; 5 pages.
Patent Owner's Motion for Pro Hac Vice Admission of William H. Manning Under 37 C.F.R. § 42.10(c), *LG Electronics, Inc.* v. *ATI Technologies ULC*, IPR2015-00321 (P.T.A.B.), filed Jan. 15, 2015; 5 pages.
Petitioner's Motion for Pro Hac Vice Admission of Jamie B. Beaber Pursuant to 37 C.F.R. § 42.10(c), *LG Electronics, Inc.* v. *ATI Technologies ULC*, IPR2015-00321 (P.T.A.B.), filed Feb. 5, 2015; 7 pages.
Petitioner's Motion for Pro Hac Vice Admission of Michael Maas Pursuant to 37 C.F.R. § 42.10(c), *LG Electronics, Inc.* v. *ATI Technologies ULC*, IPR2015-00321 (P.T.A.B.), filed Feb. 5, 2015; 7 pages.
Decision Granting Petitioner's Motions for Pro Hac Vice Admission of Jamie B. Beaber and Michael Maas 37 C.F.R. § 42.10(c), *LG Electronics, Inc.* v. *ATI Technologies ULC*, IPR2015-00321, -00322, -00325, -00326, -00327, and -00330 (P.T.A.B.), mailed Feb. 19, 2015; 4 pages.
Decision Granting Patent Owner's Motions for Pro Hac Vice Admission of Aaron R. Fahrenkrog and William H. Manning 37 C.F.R. § 42.10(c), *LG Electronics, Inc.* v. *ATI Technologies ULC*, IPR2015-00321 and -00322 (P.T.A.B.), mailed Feb. 19, 2015; 3 pages.
Petitioner's Updated Power of Attorney, *LG Electronics, Inc.* v. *ATI Technologies ULC*, IPR2015-00321 (P.T.A.B.), filed Feb. 26, 2015; 3 pages.
Petitioner's Updated Mandatory Notices, *LG Electronics, Inc.* v. *ATI Technologies ULC*, IPR2015-00321 (P.T.A.B.), filed Feb. 26, 2015; 5 pages.
Order Authorizing Filing of Motion to Withdraw and Substitute Counsel Conduct of Proceeding 37 C.F.R. § 42.10(e), *LG Electronics, Inc.* v. *ATI Technologies ULC*, IPR2015-00321 (P.T.A.B.), mailed Mar. 16, 2015; 5 pages.
Patent Owner's Motion to Withdraw as Counsel and Substitute New Counsel, *LG Electronics, Inc.* v. *ATI Technologies ULC*, IPR2015-00321 (P.T.A.B.), filed Mar. 17, 2015; 4 pages.
ATI Technologies ULC's Updated Power of Attorney Pursuant to 37 C.F.R. § 42.10(c), *LG Electronics, Inc.* v. *ATI Technologies ULC*, IPR2015-00321 (P.T.A.B.), filed Mar. 17, 2015; 3 pages.
Order Granting Patent Owner's Motion to Withdraw and Substitute New Counsel 37 C.F.R. § 42.10(a), *LG Electronics, Inc.* v. *ATI Technologies ULC*, IPR2015-00321 (P.T.A.B.), mailed Apr. 1, 2015; 4 pages.
ATI Technologies ULC's Updated Mandatory Notices Pursuant to 37 C.F.R. § 42.8(b)(3) and (b)(4), *LG Electronics, Inc.* v. *ATI Technologies ULC*, IPR2015-00321 (P.T.A.B.), filed Mar. 17, 2015; 4 pages.
Patent Owner Preliminary Response, *LG Electronics, Inc.* v. *ATI Technologies ULC*, IPR2015-00321 (P.T.A.B.), filed Apr. 2, 2015; 58 pages.
Decision Institution of Inter Partes Review 37 C.F.R. § 42.108, *LG Electronics, Inc.* v. *ATI Technologies ULC*, IPR2015-00321 (P.T.A.B.), mailed Jun. 26, 2015; 24 pages.
Scheduling Order, *LG Electronics, Inc.* v. *ATI Technologies ULC*, IPR2015-00321 (P.T.A.B.), mailed Jun. 26, 2015; 7 pages.
ATI Technologies ULC's Notice of Deposition of Dr. Dan Schonfeld, *LG Electronics, Inc.* v. *ATI Technologies ULC*, IPR2015-00321 (P.T.A.B.), filed Aug. 24, 2015; 3 pages.
Patent Owner Response, *LG Electronics, Inc.* v. *ATI Technologies ULC*, IPR2015-00321 (P.T.A.B.), filed Sep. 28, 2015; 63 pages.
Petitioner's Objections to Evidence under 37 C.F.R. § 42.64(b)(1), *LG Electronics, Inc.* v. *ATI Technologies ULC*, IPR2015-00321 (P.T.A.B.), filed Oct. 5, 2015; 7 pages.
Patent Owner's Updated Mandatory Notices Pursuant to 37 C.F.R. § 42.8(b)(2), *LG Electronics, Inc.* v. *ATI Technologies ULC*, IPR2015-00321 (P.T.A.B.), filed Oct. 8, 2015; 3 pages.
Petitioner's Updated Mandatory Notices under 37 C.F.R. § 42.8, *LG Electronics, Inc.* v. *ATI Technologies ULC*, IPR2015-00321 (P.T.A.B.), filed Nov. 12, 2015; 6 pages.
Petitioner's Notice of Deposition of Patent Owner's Expert Dr. Mangione-Smith, *LG Electronics, Inc.* v. *ATI Technologies ULC*, IPR2015-00321 (P.T.A.B.), filed Nov. 30, 2015; 5 pages.
Notice of Joint Stipulation to Modify Trial Due Dates 2 and 3, *LG Electronics, Inc.* v. *ATI Technologies ULC*, IPR2015-00321 (P.T.A.B.), filed Dec. 3, 2015; 4 pages.
Petitioner's Reply Brief in Support of the Petition for Inter Partes Review of U.S. Pat. No. 7,095,945, *LG Electronics, Inc.* v. *ATI Technologies ULC*, IPR2015-00321 (P.T.A.B.), filed Jan. 28, 2016; 28 pages.
Patent Owner's Objections to Evidence Presented with Petitioner's Reply, *LG Electronics, Inc.* v. *ATI Technologies ULC*, IPR2015-00321 (P.T.A.B.), filed Feb. 4, 2016; 4 pages.
ATI Technologies ULC's Notice of Deposition of Dr. Dan Schonfeld, *LG Electronics, Inc.* v. *ATI Technologies ULC*, IPR2015-00321 (P.T.A.B.), filed Feb. 5, 2016; 3 pages.
Patent Owner's Motion for Observation on Cross Examination of Petitioner's Reply Witness Dr. Daniel Schonfeld, *LG Electronics, Inc.* v. *ATI Technologies ULC*, IPR2015-00321 (P.T.A.B.), filed Feb. 26, 2016; 9 pages.
Patent Owner's Request for Oral Argument, *LG Electronics, Inc.* v. *ATI Technologies ULC*, IPR2015-00321 (P.T.A.B.), filed Feb. 26, 2016; 4 pages.
Petitioner's Request for Oral Argument, *LG Electronics, Inc.* v. *ATI Technologies ULC*, IPR2015-00321 (P.T.A.B.), filed Feb. 26, 2016; 4 pages.
Petitioner's Response to Patent Owner's Motion for Observation on Cross-Examination of Dr. Dan Schonfeld, *LG Electronics, Inc.* v. *ATI Technologies ULC*, IPR2015-00321 (P.T.A.B.), filed Mar. 1, 2016; 10 pages.
Order Granting Requests for Oral Hearing 37 C.F.R. § 42.70, *LG Electronics, Inc.* v. *ATI Technologies ULC*, IPR2015-00321 (P.T.A.B.), mailed Mar. 9, 2016; 4 pages.
Patent Owner's Transmittal Letter Accompanying Submission of Exhibit 2014, *LG Electronics, Inc.* v. *ATI Technologies ULC*, IPR2015-00321 (P.T.A.B.), filed Mar. 11, 2016; 3 pages.
Patent Owner's Updated Exhibit List, *LG Electronics, Inc.* v. *ATI Technologies ULC*, IPR2015-00321 (P.T.A.B.), filed Mar. 11, 2016; 4 pages.
Patent Owner's Updated Exhibit List, *LG Electronics, Inc.* v. *ATI Technologies ULC*, IPR2015-00321 (P.T.A.B.), filed Mar. 17, 2016; 4 pages.
Transmittal Letter Accompanying Submission of Exhibit 2015, *LG Electronics, Inc.* v. *ATI Technologies ULC*, IPR2015-00321 (P.T.A.B.), filed Mar. 17, 2016; 3 pages.
Petitioner's Updated Exhibit List, *LG Electronics, Inc.* v. *ATI Technologies ULC*, IPR2015-00321 (P.T.A.B.), filed Mar. 17, 2016; 4 pages.
Record of Oral Hearing, *LG Electronics, Inc.* v. *ATI Technologies ULC*, IPR2015-00321 (P.T.A.B.), mailed Apr. 13, 2016; 38 pages.
Final Written Decision 35 U.S.C. § 318(a) and 37 C.F.R. § 42.73, *LG Electronics, Inc.* v. *ATI Technologies ULC*, IPR2015-00321 (P.T.A.B.), mailed Jun. 23, 2016; 20 pages.
Patent Owner's Notice of Appeal, *LG Electronics, Inc.* v. *ATI Technologies ULC*, IPR2015-00321 (P.T.A.B.), filed Aug. 25, 2016; 5 pages.

(56) References Cited

OTHER PUBLICATIONS

File History of U.S. Pat. No. 7,095,945, U.S. Appl. No. 09/707,060, filed Nov. 6, 2000; 278 pages.
Complaint for Patent Infringement, Demand for Jury Trial, *Advanced Micro Devices, Inc., et al.* v. *LG Electronics, Inc.*, Case No. 3:14-cv-01012-SI (N.D.Cal.), filed Mar. 5, 2014; 23 pages.
Declaration of Dan Schonfeld, Ph.D., *LG Electronics, Inc.* v. *ATI Technologies ULC*, IPR2015-00321 (P.T.A.B.),Mailed Apr. 13, 2016; 260 pages.
Declaration of Jamie B. Beaber in Support of Motion for Pro Hac Vice Admission, *LG Electronics, Inc.* v. *ATI Technologies ULC*, IPR2015-00321 (P.T.A.B.), filed Feb. 15, 2015; 4 pages.
Declaration of Michael Maas in Support of Motion for Pro Hac Vice Admission, *LG Electronics, Inc.* v. *ATI Technologies ULC*, IPR2015-00321 (P.T.A.B.), filed Feb. 15, 2015; 4 pages.
Transcript of the Deposition of William Mangione Smith, *LG Electronics, Inc.* v. *ATI Technologies ULC*, IPR2015-00325 (P.T.A.B.), Jan. 11, 2016; 136 pages.
Reply Declaration of Dan Schonfeld, Ph.D. in Support of Petitioner LG Electronics, Inc., in the Inter Partes Review of U.S. Pat. No. 7,095,945, *LG Electronics, Inc.* v. *ATI Technologies ULC*, IPR2015-00321 (P.T.A.B.), filed Feb. 15, 2015; 4 pages.
Affidavit in Support of Motion for Pro Hac Vice Admission of Aaron R. Fahrenkrog under 37 C.F.R. § 42.10(c), *LG Electronics, Inc.* v. *ATI Technologies ULC*, IPR2015-00321 (P.T.A.B.), filed Jan. 15, 2015; 4 pages.
Affidavit in Support of Motion for Pro Hac Vice Admission of William H. Manning under 37 C.F.R. § 42.10(c), *LG Electronics, Inc.* v. *ATI Technologies ULC*, IPR2015-00321 (P.T.A.B.), filed Jan. 15, 2015; 4 pages.
Declaration of Dr. William Mangione-Smith in Support of the Patent Owner Response, *LG Electronics, Inc.* v. *ATI Technologies ULC*, IPR2015-00321 (P.T.A.B.), filed Sep. 28, 2015; 121 pages.
Sugimura, et al., "A Consumer Digital VCR for Digital Broadcasting," IEEE, 1998; 6 pages.
Okamoto, et al., "A Consumer Digital VCR for Advanced Television," IEEE, 1993; 6 pages.
Okamoto, et al., "A Consumer Digital VCR for Digital Broadcasting," IEEE, 1995; 8 pages.
Definition of "portion", Webster's New World Dictionary, Fourth Edition, 1999; p. 1122.
Transcript of the Deposition of Dan Schonfeld, Ph,D., *LG Electronics, Inc.* v. *ATI Technologies ULC*, IPR2015-00321 (P.T.A.B.), Sep. 9, 2015; 137 pages.
Figure 6 of U.S. Pat. No. 6,397,000, Exhibit 5 to the Deposition of Dan Schonfeld, Ph.D., *LG Electronics, Inc.* v. *ATI Technologies ULC*, IPR2015-00321 (P.T.A.B.), Sep. 9, 2015; 1 page.
"Digital video recorder", Wikipedia.org, accessed Sep. 28, 2015 at http://www.wikipedia.org/wiki/Digital_video_recorder; 15 pages.
Transcript of the Deposition of Dan Schonfeld, Ph.D., *LG Electronics, Inc.* v. *ATI Technologies ULC*, IPR2015-00321 (P.T.A.B.), Feb. 12, 2016; 92 pages.
Transcript of Teleconference, *LG Electronics, Inc.* v. *ATI Technologies ULC*, IPR2015-00321 (P.T.A.B.), Mar. 4, 2016; 23 pages.
Petitioner's Oral Hearing Demonstrative Exhibit, *LG Electronics, Inc.* v. *ATI Technologies ULC*, IPR2015-00321 (P.T.A.B.), Mar. 21, 2016; 14 pages.
Patent Owner's Oral Hearing Demonstrative Exhibit, *LG Electronics, Inc.* v. *ATI Technologies ULC*, IPR2015-00321 (P.T.A.B.), Mar. 21, 2016; 30 pages.
Petitioner's Power of Attorney, *LG Electronics, Inc.* v. *ATI Technologies ULC*, IPR2015-01620 (P.T.A.B.), filed Jul. 24, 2015; 2 pages.
Petition for Inter Partes Review of U.S. Pat. No. 7,095,945, *LG Electronics, Inc.* v. *ATI Technologies ULC*, IPR2015-01620 (P.T.A.B.), filed Jul. 24, 2015; 64 pages.
Motion for Joinder Pursuant to 35 U.S.C. § 315(c) and 37 C.F.R. § 42.122(b), *LG Electronics, Inc.* v. *ATI Technologies ULC*, IPR2015-01620 (P.T.A.B.), filed Jul. 24, 2015; 16 pages.
Notice of Filing Date Accorded to Petition and Time for Filing Patent Owner Preliminary Response, *LG Electronics, Inc.* v. *ATI Technologies ULC*, IPR2015-01620 (P.T.A.B.), mailed Aug. 6, 2015; 3 pages.
ATI Technologies ULC's Power of Attorney Pursuant to 37 C.F.R. § 42.10(b), *LG Electronics, Inc.* v. *ATI Technologies ULC*, IPR2015-01620 (P.T.A.B.), filed Aug. 12, 2015; 3 pages.
Patent Owner's Mandatory Notices Pursuant to 37 C.F.R. § 42.8(a)(2), *LG Electronics, Inc.* v. *ATI Technologies ULC*, IPR2015-01620 (P.T.A.B.), filed Aug. 12, 2015; 5 pages.
Patent Owner's Opposition to Motion for Joinder, *LG Electronics, Inc.* v. *ATI Technologies ULC*, IPR2015-01620 (P.T.A.B.), filed Aug. 24, 2015; 22 pages.
Reply in Support of Petitioner's Motion for Joinder, *LG Electronics, Inc.* v. *ATI Technologies ULC*, IPR2015-01620 (P.T.A.B.), filed Sep. 24, 2015; 11 pages.
Patent Owner Preliminary Response, *LG Electronics, Inc.* v. *ATI Technologies ULC*, IPR2015-01620 (P.T.A.B.), filed Nov. 6, 2015; 43 pages.
Decision Denying Motion for Joinder and Denying Institution of Inter Partes Review 37 C.F.R. § 42.122(b), § 42.108, *LG Electronics, Inc.* v. *ATI Technologies ULC*, IPR2015-01620 (P.T.A.B.), mailed Feb. 2, 2016; 12 pages.
Supplemental Declaration of Dan Schonfeld, Ph.D., *LG Electronics, Inc.* v. *ATI Technologies ULC*, IPR2015-01620 (P.T.A.B.), filed Jul. 24, 2015; 167 pages.
Defendants—Counterclaimants LG Electronics, Inc., LG Electronics U.S.A., Inc., and LG Electronics Mobilecomm U.S.A., Inc.'s Invalidity Contentions and Production of Documents Pursuant to Patent Local Rules 3-3 and 3-4, *Advanced Micro Devices, Inc., et al.* v. *LG Electronics, Inc., et al.*, Case No. 3:14-cv-01012-SI (N.D.Cal.), filed Oct. 1, 2014; 169 pages.
Exhibit I-01 (945) U.S. Pat. No. 5,517,250—Hoogenboom Service Chart accompanying Defedants' Invalidity Contentions, *Advanced Micro Devices, Inc., et al.* v. *LG Electronics, Inc., et al.*, Case No. 3:14-cv-01012-SI (N.D.Cal.), filed Oct. 1, 2014; 85 pages.
Request for Ex Parte Reexamination of U.S. Pat. No. 7,095,945, Control No. 90/013,817, filed Sep. 20, 2016; 61 pages.
Declaration of Dan Schonfeld, Ph.D., filed in Ex Parte Reexamination of U.S. Pat. No. 7,095,945, Control No. 90/013,817, filed Sep. 20, 2016; 198 pages.
Order Granting Reexamination of U.S. Pat. No. 7,095,945, Control No. 90/013,817, filed Sep. 29, 2016; 12 pages.

* cited by examiner

--PRIOR ART--

--PRIOR ART--

--PRIOR ART--

--PRIOR ART--

NEW SHEET

SYSTEM FOR DIGITAL TIME SHIFTING AND METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates generally to time shifting of video data, and more specifically to time shifting of digital video data.

BACKGROUND OF THE INVENTION

Systems for time shifting a viewed program are known in the industry. For example, if a viewer is interrupted by a phone call during a television program, the program can be recorded for a few minutes and then played back from the point of interruption while addition video information is continually recorded. One prior art method of accomplishing time shifting is to capture the rendered video signal. When the rendered signal is an analog signal it is digitized and stored. When the rendered signal is a digital signal it can be captured directly. Once captured, the rendered digital data can be stored directly. A digital signal stored directly can require a large amount of storage space, even when only a few minutes of video are captured. The digital signal can be compressed to reduce the amount of storage space required. However, compressing a video signal requires additional processing power, resulting in additional costs.

As the use of digital video data becomes increasingly common, a method and apparatus for time shifting a digital program that is more efficient than those known in art would be advantageous. One known method to provide digital video data is to provide the data using a specific protocol that has the ability to transmit the digital video data in a compressed format. An example of one such format is known as MPEG-2, and has been approved by the International Organization for Standards (ISO) Moving Pictures Experts Group (MPEG group). MPEG-2 is a versatile communication standard that gives theoretical explanations needed to implement an MPEG-2 decoder through the syntax and semantics of coded bit-streams. MPEG-2 is an open standard and continues to evolve and be applied to a wide variety of applications ranging from video conferencing to High Definition Television (HDTV). The MPEG-2 standard, as a generic and open standard, is intended for variety of audio/video coding applications.

One method of transporting large amounts of various types of transport stream data is to use a multiplexed packetized data stream capable of carrying real-time multimedia programs. One example of a multiplexed packetized data stream is described in the standard ISO/IEC 13818-1 and will be referred to as a transport stream. Transport streams generally offer robustness for noisy channels and can carry multiple programs (like multiple TV services) within the same multiplex. The transport stream is based on 188 byte long packets that are well suited for hardware error correction and processing schemes needed in noisy environments, such as coaxial cable television networks and satellite transponders. Such a transport stream facilitates fast program access, channel hopping and synchronization between multiple programs within the transport stream.

A transport stream consists of fixed length packets based on 4 bytes of header followed by 184 bytes of data payload, where data payload is obtained by partitioning larger data blocks. For example, an elementary stream (ES) is a set of data generally consisting of compressed data from a single source, such as a video or audio source, with some additional ancillary data for identification, characterization and synchronization. ES streams are first packetized into either constant length or variable length Packetized Elementary Stream packets (PES packets) consisting of header and payload. Each PES packet header starts with start code (ox000001) followed with the stream id byte identifying type of ES underneath.

PES packets from various elementary streams are merged together to form a program (service) with its own system time clock (STC). All ES component streams within one program are synchronized have periodic PTS stamps corresponding to the STC counter to indicate the proper timing for each ES.

The relatively long and most often variable length PES packets are further packetized into shorter TS packets having a constant size of 188 bytes. A small and constant TS packet size makes error recovery easier and faster. Usually, the transport stream carries several programs, each with its own STC. Each TS packet consists of a TS Packet header with optional Adaptation Field followed by useful data payload containing portion of a PES packet. The TS header consists of a sync byte, flags, indicators information for error detection and timing and Packet_ID (PID) field used to identify elementary stream carried underneath of a PES packet. In addition to identifying specific elementary streams, one PID is used to identify a program specific Information (PSI) table data.

Each TS PSI table is sent in sections, usually occupying one or more TS packets. Four types of PSI tables exist: 1) Program Association Table (PAT) listing unique program_number (as an identifier of each program in one multiplex) and PID of the PMT table; 2) Program Map Table (PMT) listing PIDs of all component streams making a given program. PMT may be constructed for each program separately or be common for a group of programs; 3) Conditional Access Table (CAT) identifying PID of Entitlement Management Messages and ID of used conditional access system if any scrambling of TS or PES packets is done; 4) Private Table carrying Network Information Table (NIT) or private data.

The Hierarchical structure which exists between ES streams, PES and TP packets is illustrated in prior art FIGS. 1-4.

A method and apparatus for efficient time shifting of multiplexed packetized data streams, such as a packet stream, would be advantageous.

DETAILED DESCRIPTION OF THE DRAWINGS

A specific method and apparatus is disclosed describing a time shifting technique. In one embodiment, the disclosed time shifting technique can be based upon a hardware transport stream demultiplexer that interfaces to a transport stream. The hardware demultiplexer application assists in the extraction and parsing of a multiplexed packetized data stream, such as a MPEG-2 Transport Stream (TS) multiplex. One such hardware demultiplexer is disclosed in patent application Ser. No. 09/489,682, which is hereby incorporated herein by reference. The disclosed hardware transport core is used to filter component streams into 15 memory ring buffers, one allocated in the frame memory for the dedicated MPEG-2 video decoder and others in the system memory for the dedicated software parser. It can demultiplex the most frequent transport packets of video stream into an Elementary Stream (ES) by monitoring the first packet identifier (PID) of each TS packet. This flexible filter can be set to extract private data from the adaptation field (AF) or from the PES packet header. Thirty-one other PIDs can be simply filtered and routed to a common (joint) or individual memory buffers for subsequent software processing on the host processor. The basic idea of a time shifting is shown in FIG. 5.

Figure 1:
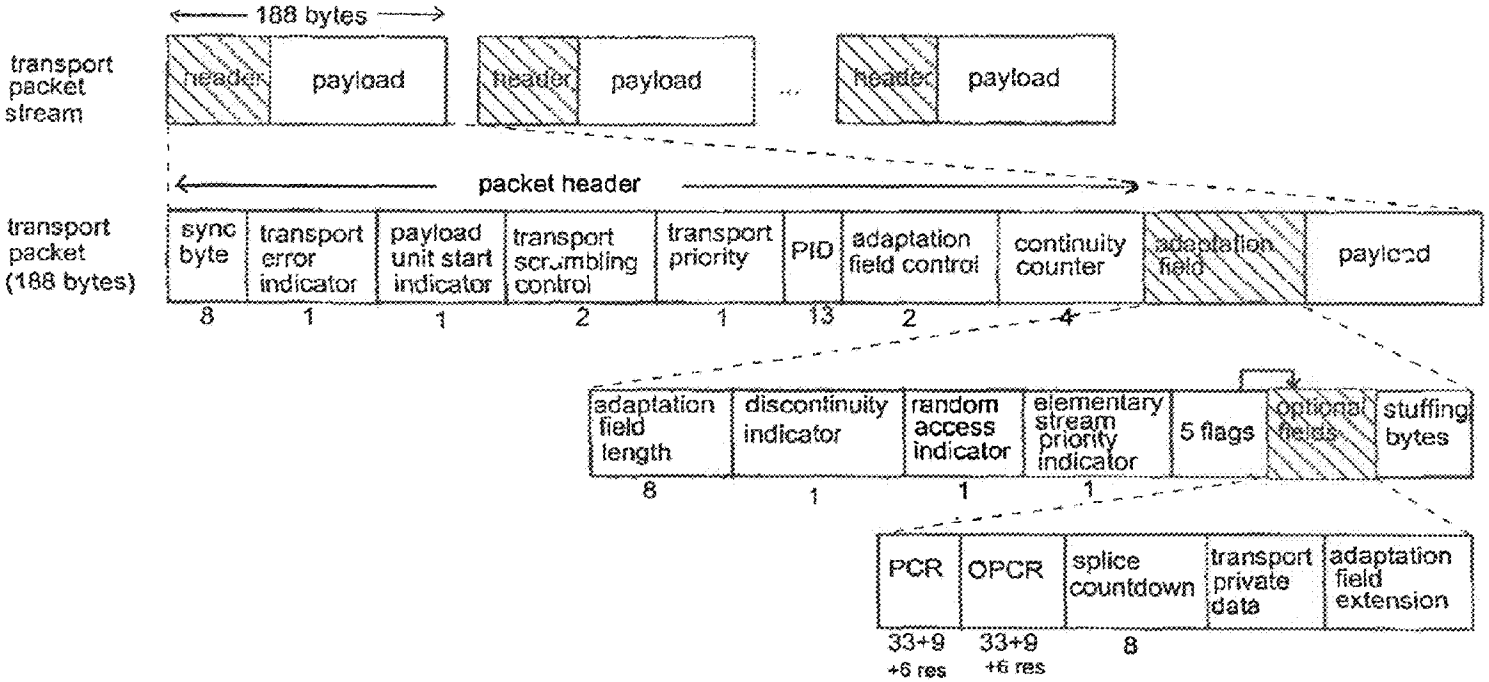
FIGS. 1-4 illustrate various information associated with an MPEG transport stream of the prior art.
Figure 2:
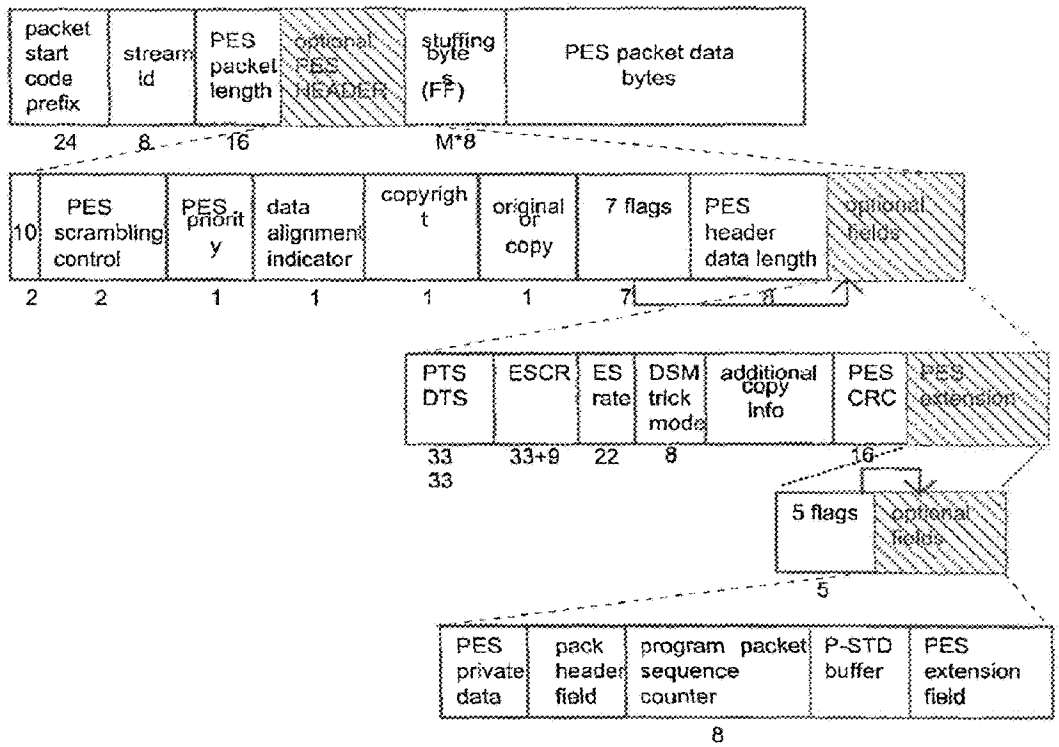
Figure 3:
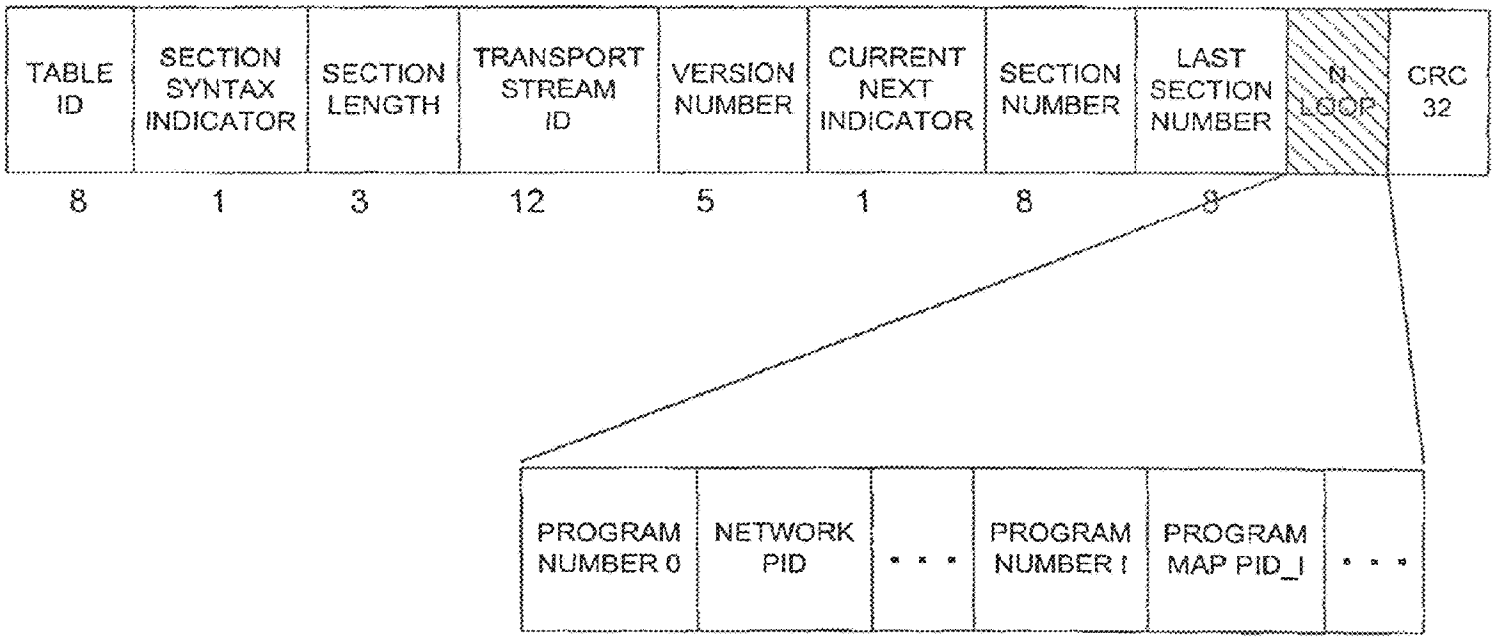
Figure 4:
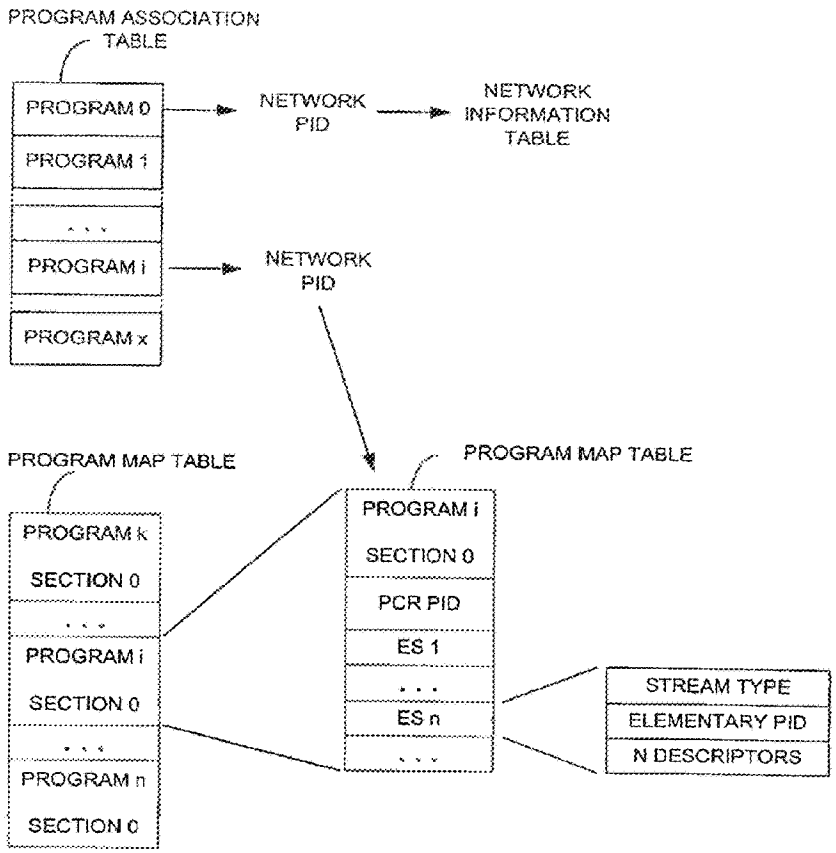
Figure 5:
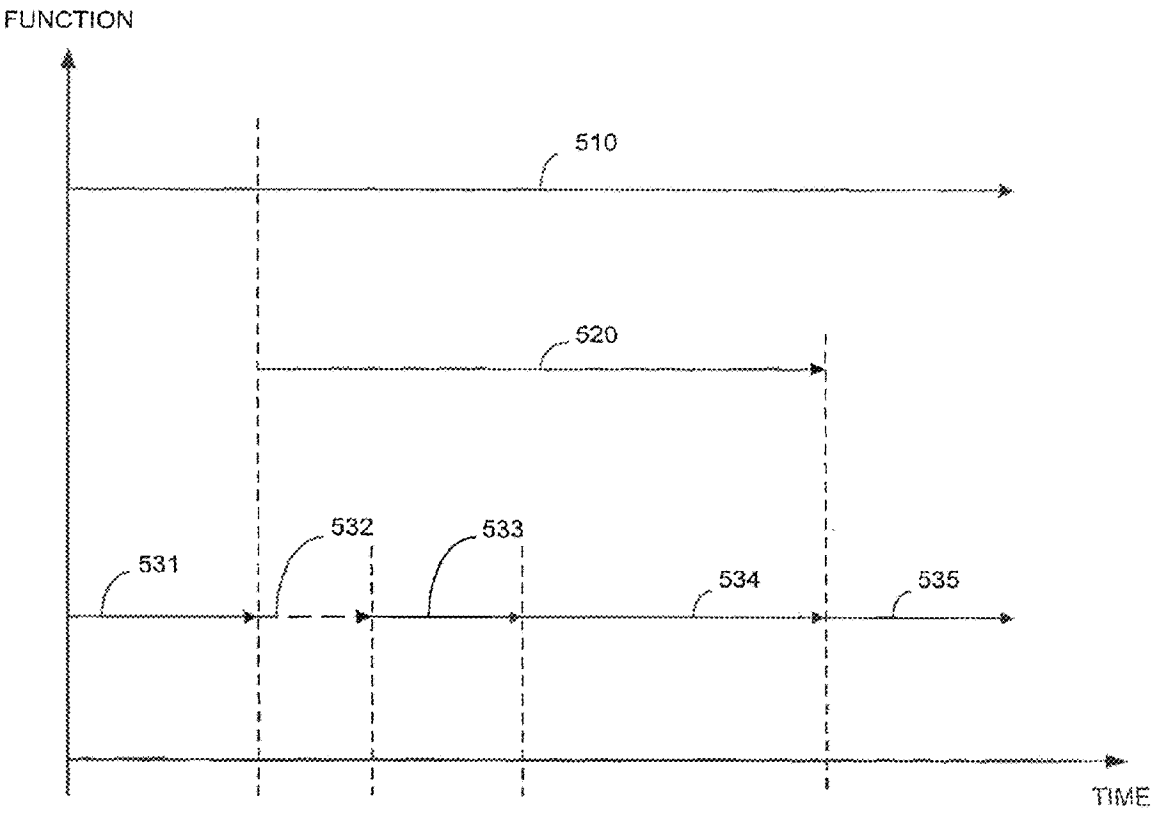
FIG. 5 illustrates in graphical form a time line indicating various modes of operation in accordance with the present invention.

FIG. 5 illustrates three functions performed by a time shifting system. A first function is to receive a live broadcast stream 510. According to the graph of FIG. 5, the live broadcast stream is continuously received during the time represented in FIG. 5.

A second function of a time shifting system is to record a specific program after a user activates the time shifting feature. Vector 520 of FIG. 5 indicates when a specific program is being recorded by the time shifting system.

A third function of the time shifting system is to display the specific program. Vector 530 of FIG. 5 indicates when a specific program is being played back. Specifically, vector portion 531 represents the time where the program is being displayed directly from the live broadcast stream. Vector portion 532 represents the time that the user is unable to view the program, i.e. the user is away from the television. Therefore, in one embodiment, during this time no program is displayed. In an alternate embodiment, the live feed can continue to be displayed, even though the program is being recorded.

Vector 533 represents the time during which the time-shifted program, which has been stored, is being replayed at a normal playback rate. Note that during this time, the live program feed continues to be recorded for future time shifted play back.

Vector 534 represents a time during which the time shifted program is being replayed at a faster than normal replay rate. By being able to playback at a faster than normal rate, it is possible to catch-up to the live broadcast stream.

The receive-only mode of vector 31 represents where the digital transport stream receiver (DTSR) is receiving a live broadcast and demultiplexing one program of a plurality of programs available in the live broadcast stream. This will be referred to as Transparent Mode indicating the transport stream is accessed immediately and not saved. Therefore, from the point of view of digital storage media (DSM), the received data is transparent.

Note that the PAT table is constantly acquired, in transparent mode, and other modes, so that version number change or PMT table PID change for a currently viewed program can be detected. If such a change occurs during the live broadcast of a program, PIDs will be reprogrammed for video and splicing with be handled.

A Continuous Time Shifting Mode occurs during vectors 532-534. Continuous time shifting mode occurs when time shifting is selected by the viewer to store part or all of a program for later viewing after a short or long intermission. During continuous time shifting mode, a selected program from a given multiplex is received and stored on a hard disk, or other storage media, in the form of full transport stream packets or PES packets.

A Part-Time Time-Shifting Mode, when selected by the viewer, allows for replay of a time shifted program or fast forward (FF) replay of a time shifted program at user defined FF speed. In FIG. 5 this is represented as vectors 533 and 534. In a specific embodiment discussed herein, this time-shifting mode is the most demanding mode of the 3 described modes because: the host CPU system is receiving and storing a real time event; at the same time, the host CPU is retrieving saved stream data from the disk; simultaneously with first two operations, the host CPU is performing transport stream de-multiplexing of video, audio, private and PSI/SI data on a host CPU; and at the same time the host CPU is restoring PCR/PTS time-base information as described later.

For some digital television applications, time-shifting may be considered a peak event that occurs sometimes or occasionally. However, some users may depend on it all the time, up to the end of the current program once it was started. For those users, typical operating state of the system is time shifting, de-coupled from the live stream. Time shifting of the digital transport stream should offer the same quality as from the live broadcast (source stream).

Systems suitable for time-shifting need to simultaneously receive and decode a transport stream and handle incoming source stream (to process all PSI and SI data) and record incoming source stream as a full entity or just its one program. Time shifting allows the viewer to step away from the TV monitor without missing any of the program parts. One embodiment of time shifting includes storing all transport packets received on the transport stream. Another embodiment of time shifting that is more efficient includes: 1) selecting just the transport packets of interest (PSI, SI, video, audio and data packets) that constitute one program event to minimize the bit-rate of the recorded stream, to minimize the bandwidth through the host bus interface unit, and to minimize hard disk head movement (if any); 2) increasing the amount of storage and useful life of the hard disk; and 3) assuring that the amount of data that needs to be processed by the host processor is received and stored as: transport stream packets; PES packets of video, audio, data, PSI and SI content, de-multiplexed transport; or PES packets of video and audio and bus master compressed video into the video bit-stream buffer of the MPEG video decoding device.

Selection of just one time shifted program reduces the potentially high bit-rate of a transport stream multiplex to a manageable size, suitable for storage on current 10 GB hard disk units (two hours of 10 Mbps stream). Obviously, a large disk drive is needed to allow any reasonable length of time shifting. In time shifting mode where time shifted material is simultaneously received and stored, the bit-rate of the host bus-interface unit (HBIU) needs to be double a system where the HBIU is only responsible for playing a single program stream. Generally the bandwidth needed is calculated to be approximately 20 Mbps instead 10 Mbps.

Because closed or proprietary systems, such as set-top boxes, usually do not share the hard disk drive with other systems, very specialized disk drives for audio-video applications with specialized interfaces can be used. Hard drive features that would be advantageous include: 1) Increasing access speeds and sustained sequence transfers in two directions; 2) Having deferred re-calibration of drive heads to prevent glitches or latencies during playback; 3) Having head offsets to prevent losing a revolution when going from side to side on a platter; 4) Supporting on the fly error correction; and 5) Having embedded multi-disk drive units that decrease access latencies.

The operating system can play a significant role in the efficient use of the drive by accessing most frequent video data in large blocks and decreasing seek time. Generally, larger read/write blocks increase efficiency of data storage and retrieval. Sometimes they can cause unwanted glitches by increasing latency during access.

Figure 6:
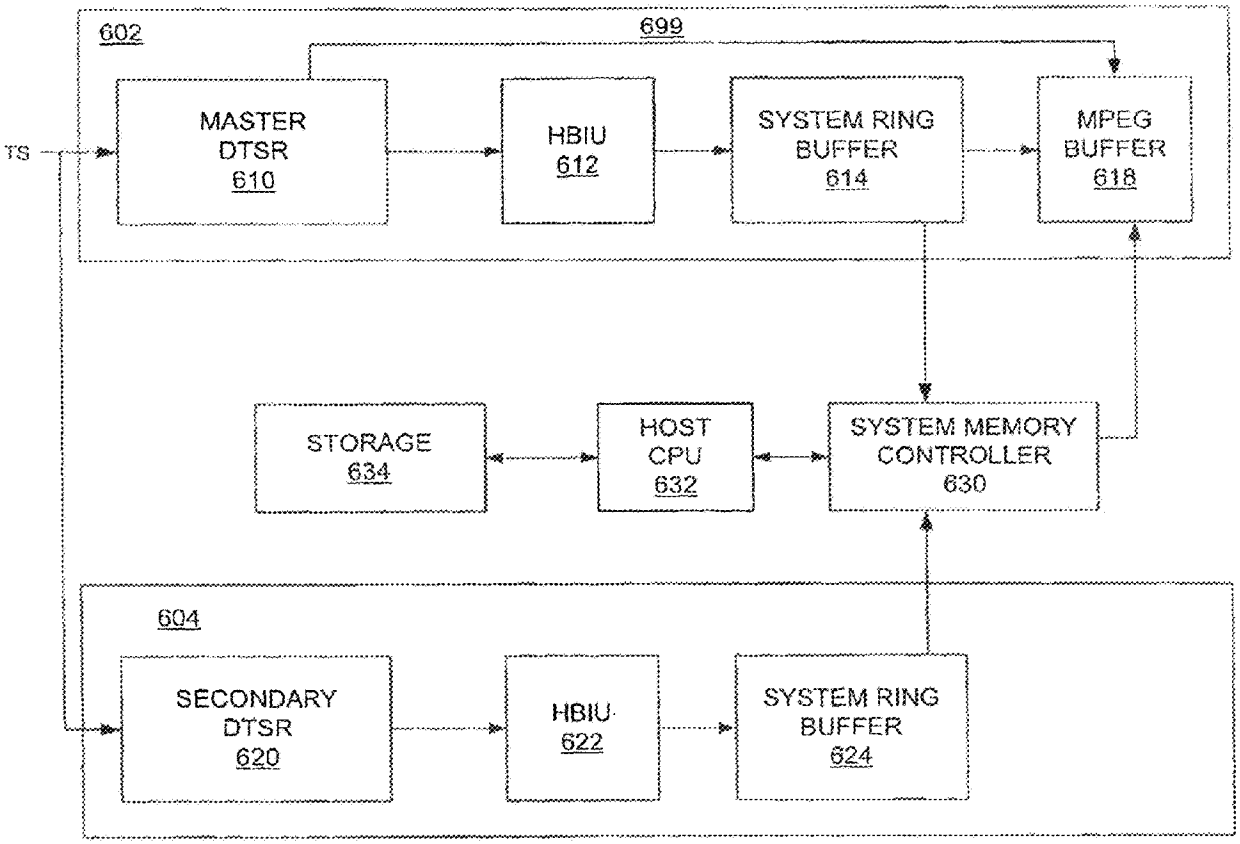
FIG. 6 illustrates in block diagram form a specific embodiment of a system having to digital transport stream receivers in accordance with the present invention.

The first time shifting mode of operation is a receive-only mode. During receive-only mode of operation a master digital time shifting receiver (DTSR) 610, of FIG. 6, is programmed to receive and parse transport stream packets matching video and PCR PIDs. A host CPU 632 is assisting MPEG-2 clock recovery, and the same recovered clock data is supplying Master DTSR 610 and the Secondary DTSR 620. In one embodiment, the recovered clock is provided to the secondary DTSR 620 registers through the use of the system memory controller 630. Also, the Master DTSR 610 is programmed to perform PID filtering of audio, private, and PSI/SI PIDs programmed in the auxiliary PID registers. Secondary DTSR 620 is programmed for PID filtering operations on Video PID programmed on a first auxiliary PID register. However, since the receiver is in receive-only mode, the video transport packets in the ring buffer 624 are disregarded. The clock recovery algorithm is suppressed on the secondary DTSR 620. Only STC of the slave DTSR is set upon the channel change. Host CPU 632 performs PES parsing of audio transport stream packets, decode and presentation of audio frames (on AC-97 codec or wave device), and continuous parsing and data processing of PSI sections monitoring real-time events like PID change, PCR discontinuity or splicing of audio stream. This activity by the host CPU 632 is part of the normal receive only mode of operation where a specified channel is being decoded and displayed. Specific systems and methods for supporting these processes are described in the patent application already incorporated by reference.

When in continuous time-shifting mode of operation, the host CPU 632 performs additional processing including: retrieval; multiplexing; time base corrections; storage of video audio, private and PSI/SI transport stream packets from multiple buffers 614 allocated in the memory space of the host CPU. In one embodiment, however, the master DTSR 620 is used to decode and display video stream as describe previously with reference to receive only mode. Transport packets from a common program are retrieved from the buffer 614 and provided to a digital storage media circular file system in a multiplexed manner. Multiplexing is performed by inserting audio, video, private, and PSI/SI transport stream packets to satisfy a group of relevant criteria.

Fundamental functions performed during continuous digital time shifting include: 1) Preserving of original ES_rate of each component stream; 2) Limiting PCR jitter of newly created single program multiplex; 3) Preserving VBV_delay value (the number of periods of a 90 KHz clock derived from the 27 MHz system clock that the VBV shall wait after receiving the final byte of the picture start code before decoding the picture) to insure non-interrupted MPEG video decode after initial VBV_delay time in constant bit-rate (CBR) stream environments; 4) Preventing underflow or overflow of elementary stream decoder buffers in accordance with the T_STD model defined in ISO/IEC 13818-1 standard; 5) providing PID values in the video or audio TS packets that were originally defined in the PMT section to be a video or audio PIDs. Alternatively, a new artificial PCR stream can be separately created and injected as TS PCR packets at the rate of at least 10 times per second to create a new time base for decimated, time-shifted stream stored on the DSM. Whereby, the original PAT transport packet is modified or a new PAT packet is inserted into the stream instead of the original PAT section to indicate a single program only whose PMT section indicates video, audio, PCR and other PID that carry subtitles, program descriptions, etc. As a stable clock source, STC of the Master DTSR is used to measure elapsed time between two PCR samples; 6) Providing PTS values in the video, audio or private data streams by using STC of the Master DTSR as elapsed time counter; and 7) Initializing STC of the playback DTSR device to a first available PCR value encoded in the stream saved on DSM media, immediately after channel change.

While in part-time digital time-shifting mode, the host CPU 632 performs some additional processing like retrieval and de-multiplexing of the single program transport stream created in continuous time digital time-shifting mode during a storage process. Generally, the playback of the stored program is combined with continued transport stream de-multiplexing and recording of the real-time transport stream. Such a mode of operation is the most intensive mode of operation because the host CPU 632 must, create/store a multiplexed single program transport stream from a continued reception of a live broadcast; and retrieve and demultiplex saved content from a digital storage media while performing transport stream de-multiplexing, audio decode, and bus mastering elementary stream video to the MPEG video decoder.

In one implementation, an MPEG decoder associated with the Master DTSR 610 is used to decode and display a video stream from a DSM media and receive private data, and PSI/SI sections from a live broadcast. In such a case, a video PID of the Master DTSR 610 is disabled, while video data with its PTS information is fed directly to the MPEG decoder using the system memory controller 630. However, PCR PID is programmed on a Master DTSR so that MPEG clock recovery continues from a live transport stream feed and is supplied to the STC counters of both the master DTSR 610 and the second DTSR 620. In one implementation, only the video PID is programmed into the Slave DTSR for retrieving live video stream and sending it to circular buffer on the host system in the form of a full MPEG-2 transport stream packets, while the Master DTSR is used to buffer the non-video components of a specific program.

In another embodiment, a different partition of the software tasks is possible on the host CPU 632 to achieve all three modes of a digital time shifting. In the second embodiment, a first DTSR is used as a combo video-PCR only device, either to receive and decode video from a live broadcast or from a DSM media. The PCR PID of the first DTSR is programmed always to match live broadcast, and full clock recovery is done by the first DTSR. A second DTSR can be used in all 3 modes to receive video, audio, private data and PSI/SI sections, all utilizing auxiliary PID filters and received as full MPEG-2 transport packets arriving in the single memory queue. This way, the temporal order of a stream and validity of the T-STD decoder model is inherently preserved. Also, the amount of the host DRAM memory required for queue allocation is less than in the first case. In both embodiments, a quality digital stream time shifting at the transport packet level is achieved.

In yet another operating mode, a different partition of the software tasks is possible on the host CPU 632 to achieve all three modes of digital time shifting by storing PES layers as a basic format of the audio/video data saved on a DSM. In PES operating mode, two hardware embodiments are possible, the same as in TP operating mode.

In a first hardware embodiment, the first DTSM is used as a combo device, to achieve playback of live or stored MPEG video and reception of audio, private & PSI/SI content. The second device is used only to receive and de-multiplex MPEG-2 video transport stream and retrieve MPEG-2 elementary stream from a live broadcast. Upon retrieval of ES video, PES packets are formed and stored on the DSM media. In the second hardware embodiment, the first DTSM is used as a combo video-PCR only device, either to receive and decode video from a live broadcast or from a DSM media. The PCR PID is programmed always to match live broadcast, and full clock recovery is done by the first DTSR. A second DTSR is used in all 3 time-shifting modes to receive audio, private data, PSI/SI sections, by utilizing auxiliary PID filters to store the transport packets to a single memory queue. That way, a temporal order of a stream and validity of T-STD decoder model is already preserved.

In yet another time shifting embodiment, the video is de-multiplexed to the level of elementary stream and stored at the bit-stream buffer of the MPEG video decoder physically allocated in the frame memory. The MPEG video stream is then retrieved from this buffer by a software processing thread running on a host CPU. Every time a picture start code is found in the video bit-stream buffer, a full compressed MPEG picture, in the form of elementary stream, is sent to the system memory buffer by DMA. One such method is disclosed in patent application Ser. No. 09/489,682 which is hereby incorporated herein by reference.

Before storing the full compressed MPEG picture in the DSM, a PES packet header is added. The audio stream is de-multiplexed and decoded by the host CPU. In a similar fashion as the video, prior to audio decoding, the audio frames are packetized into PES packets. Essential information from the PSI/SI/private data tables is decoded and stored in a pure source form on a DSM. This way, further reduction of the host DRAM memory requirements for queue allocation and memory on the DSM media is reduced. An advantage of this mode is reduction of CPU cycles needed for A/V playback of stored data due to the PES format of audio/video data. PES de-multiplexing is done in place, passing pointers to the payload of PES packets that contain video or audio frames, other implementations required they be sent by DMA to the video decoder before they were decoded on host CPU (MPEG or AC-3 audio). As a result, the host CPU doesn't move any raw audio or video data, and host CPU utilization is reduced in order of magnitude compared to TS playback operating mode.

*Embodiments of the invention include a system comprising a first input node to receive a multiplexed packetized data stream that carries realtime multimedia programs; a first transport stream demultiplexer that has an input coupled to the first input node to select packets of data having a predefined packet identifier and an output to provide the select packets of data; a storage device having a data port coupled to the output of the first transport stream demultiplexer to receive the select packets, wherein the storage device is to store the select packets; a first clock recovery module having an input coupled to the first input node, and an output, wherein the clock recovery module is to generate a clock at the output based upon received timing information transmitted in packets of the multiplexed packetized data stream before it is stored in the storage device; and a decoder having a first input coupled to the output of the first clock recovery system to receive the clock, a second input coupled the data port of the storage device to receive the select packets, and an output to provide decoded real-time data.*

Figure 7:
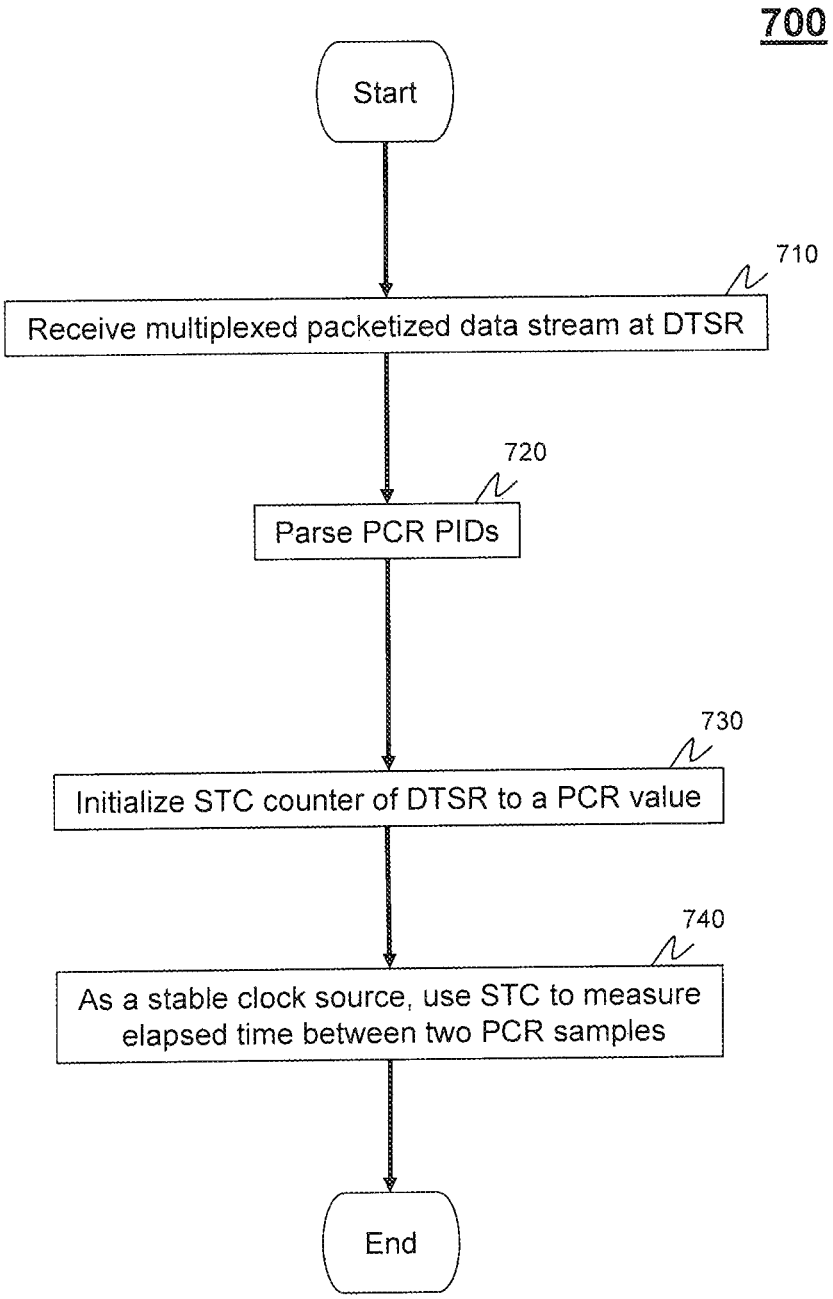
*FIG. 7 illustrates in flowchart form a specific embodiment of a clock recovery algorithm.*

*FIG. 7 illustrates in flowchart form a specific embodiment of a clock recovery algorithm to generate a clock, in accordance with the present invention. Algorithm 700 begins with step 710, in which a multiplexed packetized data stream is received at Master DTSR 610. In step 720, PCR PIDs are parsed to provide a PCR value. In step 730, the STC counter of Master DTSR 610 is initialized to the PCR value. In step 740, as a stable clock source, use STC to measure elapsed time between two PCR samples.*

In the foregoing specification, the invention has been described with reference to specific embodiments. However, one of ordinary skill in the art appreciates that various modifications and changes can be made without departing from the scope of the present invention as set forth in the claims below. For example, the specific time-shifting implementation has been described as with reference to a specific transport stream demultiplexer, and described in a previous applications which have been incorporated by reference. Different transport stream demultiplexers and method of implementing specific aspects of the present invention can be used as well. Likewise, specific partitions between hardware and software implementions have been described, which can vary depending upon the implemented demultiplexer. For example, the video stream parser can be designed to support routing the parsed video data to a circular buffer that is accessible by the system memory controller. Accordingly, the specification and figures are to be regarded in an illustrative rather than a restrictive sense, and all such modifications are intended to be included within the scope of present invention. In the claims, means-plus-function clause(s), if any, cover the structures described herein that perform the recited function(s). The mean-plus-function clause(s) also cover structural equivalents and equivalent structures that perform the recited function(s). Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method comprising:

receiving a multiplexed packetized data stream that carries real-time multimedia programs;

during a first time:

storing a first portion of the packetized data stream representing video data and timing data of a program;

setting a system time indicator to a stored system time value *before storing the first portion of the packetized data stream*, wherein the stored system time value is based on a portion of the timing data of the first portion of the packetized data stream; *and* during a second time:

incrementing the system time indicator;

retrieving the video data of the first portion of the packetized data stream for video decoding; and storing a second portion of the packetized data stream representing video data and timing data of the program.

2. The method of claim 1, wherein storing the first portion of the packetized data stream includes the first portion of the packetized data stream representing audio data of the program;

storing the second portion of the packetized data stream includes the second portion of the packetized data stream representing audio data of the program;

the method further including:

during the second time:

accessing the audio data of the first portion of the packetized data stream for audio playback.

3. The method of claim 1, wherein the multiplexed packetized data steam is a multiplexed packetized data stream that substantially meets an MPEG2 specification.

4. The method of claim 3, wherein storing the first portion includes storing transport stream packets.

5. The method of claim 4, wherein storing the first portion includes:

determining transport stream packets containing data associated with the program; and storing the transport stream packets containing data associated with the program after the step of determining.

6. The method of claim 3, wherein storing the first portion includes storing packetized elementary stream (PES) packets.

7. The method of claim 6, wherein storing the first portion includes:

determining transport stream packets containing data associated with the program; and storing PES packets based upon the transport stream packets containing data associated with the program after the step of determining.

8. The method of claim 1, wherein storing the first portion of the transport stream includes the timing data including synchronization information used for playing the program back at a real time program bit-rate.

9. The method of claim 1, wherein incrementing the system time indicator includes incrementing the system time indicator based upon a signal generated from multiplexed packetized data stream data received after the first time.

10. The method of claim 1 further comprising:

decoding the video data of the first portion to provide a decoded video stream.

11. The method of claim 10, wherein receiving a multiplexed packetized data stream and decoding the video data are performed by an integrated semiconductor device.

12. The method of claim 10 further comprising:

providing the decoded video stream for display at a play back rate.

13. The method of claim 12 wherein the play back rate is a real time rate.

14. The method of claim 12, wherein providing the decoded video stream for display includes determining the play back rate based upon clock recovery data of the first portion of the transport stream, wherein the play back rate varies depending upon a rate at which the first portion of the transport stream data is provided to a decoder during the step of decoding.

15. The method of claim 12 wherein providing the decoded video stream for display includes determining the play back rate based upon timing data received from the multiplexed packetized data stream after the first time.

16. The method of claim 15, wherein the timing data received from the multiplexed packetized data stream after the first time is associated with a current real-time data stream.

17. The method of claim 12, wherein the play back rate is faster than a real time rate.

[18. A method comprising:

determining a mode of operation;

during a first mode of operation:

receiving a multiplexed packetized data stream at a first demultiplexer;

selecting a first program from the multiplexed packetized data stream;

decoding a video portion of the first program for display;

during a second mode of operation:

receiving the multiplexed packetized data stream at the first demultiplexer;

selecting the first program from the multiplexed packetized data stream;

storing the first program;

during a third mode of operation:

receiving the multiplexed packetized data stream at the first demultiplexer;

selecting the first program from the multiplexed packetized data stream;

storing a first program portion of the first program;

providing the first program portion to a second demultiplexer;

selecting at the second demultiplexer a video portion of the first program portion;

decoding the video portion of the first program portion for display; and storing a second program portion of the first program simultaneous to the step of decoding.]

19. The method of claim [18.] *28* further comprising:

during the third mode of operation:

providing the second program portion to [a] *the* second demultiplexer;

selecting [at] *by* the second demultiplexer a video portion of the second program portion; and decoding the video portion of the second program portion for display.

20. The method of claim [18] *28* further comprising:

during the third mode of operation:

incrementing a counter associated with the second demultiplexer based upon a signal generated using a live feed of the multiplexed packetized data stream as it is received at the first demultiplexer.

[21. A system comprising:

a first input node to receive a multiplexed packetized data stream that carries real-time multimedia programs;

a first transport stream demultiplexer having an input coupled to the first input node to select packets of data having a predefined packet identifier and an output to provide the select packets of data;

a storage device having a data port coupled to the output of the first transport stream demultiplexer to receive the select packets, wherein the storage device is to store the select packets;

a first clock recovery module having an input coupled to the first input node, and an output, wherein the first clock recovery module is to generate a clock at the output based upon received timing information transmitted in packets of the multiplexed packetized data stream before the select packets are stored in the storage device; and a decoder having a first input coupled to the output of the first clock recovery module to receive the clock, a second input coupled the data port of the storage device to receive the select packets, and an output to provide decoded real-time data.]

[22. The system of claim 21, wherein the first clock recovery module further generates the clock based upon data transmitted in packets of a currently received multiplexed packetized data stream.]

[23. The system of claim 21, wherein the first clock recovery module further generates the clock based upon multiplexed packetized data stream data stored in the storage device.]

[24. The system of claim 21, wherein the decoder includes a video decoder.]

[25. The system of claim 24, wherein the decoder includes an audio decoder.]

[26. The system of claim 21 further comprising:

a second transport stream demultiplexer having an input coupled to the data port of the storage device.]

[27. The system of claim 26 further comprising;

a second clock recovery module having an input coupled to the data port of the storage device to allow STC setting based on a stored system time.]

*28. A method comprising:*

*determining a mode of operation;*

*during a first mode of operation:*

*receiving a multiplexed packetized data stream at a first demultiplexer;*

*selecting by the first demultiplexer a first program from the multiplexed packetized data stream;*

*decoding a video portion of the first program for display;*

*during a second mode of operation:*

*receiving the multiplexed packetized data stream at the first demultiplexer;*

*selecting by the first demultiplexer the first program from the multiplexed packetized data stream;*

*storing the first program;*

*during a third mode of operation:*

*receiving the multiplexed packetized data stream at the first demultiplexer;*

*selecting by the first demultiplexer the first program from the multiplexed packetized data stream;*

*storing a first program portion of the first program;*

*providing the first program portion to a second demultiplexer;*

*selecting by the second demultiplexer a video portion of the first program portion;*

*decoding the video portion of the first program portion for display; and*

*storing a second program portion of the first program simultaneous to the step of decoding, wherein the first and second program portions are different portions of the first program.*

*29. The method of claim 19, further comprising:*

*during the third mode of operation:*

*retrieving the first program portion from storage prior to providing the second program portion to the second demultiplexer.*

*30. The method of claim 28, wherein a presentation time stamp of the first program portion is different than a presentation time stamp of the second program portion.*

*31. The method claim 28, wherein the first demultiplexer is a hardware demultiplexer.*

*32. The method of claim 28, wherein the second demultiplexer is a hardware demultiplexer.*

*33. The method of claim 28, wherein the multiplexed packetized data stream includes a plurality of real-time multimedia programs.*

*34. The method of claim 33, wherein the first program is selected from the plurality of real-time multimedia programs.*

*35. The method of claim 28, wherein the third mode of operation is triggered based on a user input.*

*36. The method of claim 28, further comprising:*

*during the third mode of operation:*

*generating a clock, at a clock recovery module, based upon timing information transmitted in the multiplexed packetized data stream.*

*37. The method of claim 36, wherein the clock is generated at the clock recovery module prior to storing the first program portion.*

*38. The method of claim 37, further comprising determining a playback rate for the first program portion based upon the generated clock.*

*39. The method of claim 38, wherein decoding the video portion of the first program includes:*

*decoding, at the playback rate, the video portion of the first program portion for display.*

*40. The method of claim 39, wherein the playback rate is a real time rate.*

*41. The method of claim 39, wherein the playback rate is faster than a real time rate.*

*42. The method of claim 37, further comprising determining a playback rate for the first program portion based upon a rate at which the first program portion is provided to a decoder during decoding of the video portion of the first program.*

*43. The method of claim 36, wherein the timing information includes synchronization information used for playing the first program back at a real time rate.*

*44. The method of claim 28, further comprising:*

*during the third mode of operation:*

*retrieving the first program portion from storage prior to providing the first program portion to the second demultiplexer.*

*45. The method of claim 28, wherein storing the first program portion during the third mode of operation further comprises:*

*storing audio data of the first program portion.*

*46. The method of claim 45, further comprising:*

*during the third mode of operation:*

*accessing, when the first program portion is decoded for display, the audio data for audio playback.*

*47. The method of claim 28, wherein, during all three modes of operation, selecting the first program from the multiplexed packetized data stream comprises performing parsing and extraction operations to select the first program.*

*48. The method of claim 28, wherein, during all three modes of operation, selecting the first program from the multiplexed packetized data stream comprises identifying packet identifiers.*

*49. The method of claim 28, wherein, during the third mode of operation, decoding comprises decoding at either a normal playback rate or a faster than normal rate.*

*50. The method of claim 49, wherein the faster than normal rate comprises a user defined fast forward speed.*

*51. The method of claim 28, wherein, during the first mode of operation, the multiplexed packetized data stream is not stored.*

*52. The method of claim 28, wherein, during the third mode of operation, each storing step comprises storing full stream packets.*

*53. The method of claim 28 wherein, during the third mode of operation, the decoding comprises restoring time base information from the retrieved first program portion.*

*54. The method claim 28 wherein, during the second mode of operation, the storing comprises storing the first program portion in large blocks.*

*55. The method of claim 28 wherein, during the first and third modes of operation, decoding the video portion of the first program for display comprises decoding video packets and further comprises decoding audio packets.*

*56. The method of claim 28 wherein, during the first and third modes of operation, decoding the video portion of the first program for display further comprises monitoring for real-time events.*

*57. The method of claim 28, further comprising, during the third mode of operation, displaying the decoded video portion of the first program portion simultaneous to the step of storing the second program portion of the first program.*

*58. The method of claim 28, wherein storing the first program portion includes storing transport stream packets.*

*59. The method of claim 28, wherein storing the first program portion includes storing packetized elementary stream (PES) packets.*

*60. The method of claim 28, wherein the first demultiplexer is a transport stream demultiplexer.*

*61. The method of claim 28, wherein the third mode is a part-time time-shifting mode.*

*62. The method of claim 28, wherein each mode of operation is performed using a television equipped with a digital television application.*

*63. The method of claim 28, wherein each mode of operation is performed using a computer equipped with a digital television application.*

* * * * *